US006804198B1

(12) United States Patent
Iwamoto

(10) Patent No.: US 6,804,198 B1
(45) Date of Patent: Oct. 12, 2004

(54) ATM CELL BUFFER SYSTEM AND ITS CONGESTION CONTROL METHOD

(75) Inventor: Hiroyuki Iwamoto, Tokyo (JP)

(73) Assignee: NEC Corporation, Tokyo (JP)

(*) Notice: Subject to any disclaimer, the term of this patent is extended or adjusted under 35 U.S.C. 154(b) by 0 days.

(21) Appl. No.: 09/575,820

(22) Filed: May 22, 2000

(30) Foreign Application Priority Data

May 24, 1999 (JP) .......................................... 11-143366

(51) Int. Cl.[7] .............................................. H04Q 11/04
(52) U.S. Cl. ...................................... 370/235; 370/412
(58) Field of Search ................................ 370/229, 235, 370/232, 233, 234, 395.21, 395.4, 395.41, 395.42, 395.43, 412, 413, 414, 415, 416, 417, 418, 419

(56) References Cited

U.S. PATENT DOCUMENTS

| | | | |
|---|---|---|---|
| 5,050,163 A | * 9/1991 | Van Bavel et al. | 370/233 |
| 5,535,197 A | * 7/1996 | Cotton | 370/395.72 |
| 5,555,265 A | * 9/1996 | Kakuma et al. | 370/395.43 |
| 5,724,358 A | * 3/1998 | Headrick et al. | 370/418 |
| 5,748,614 A | 5/1998 | Wallmeier | |
| 5,757,771 A | * 5/1998 | Li et al. | 370/235 |
| 5,838,681 A | * 11/1998 | Bonomi et al. | 370/395.41 |
| 5,867,480 A | * 2/1999 | Thomas et al. | 370/230 |
| 5,901,139 A | * 5/1999 | Shinohara | 370/232 |
| 5,938,749 A | * 8/1999 | Rusu et al. | 710/54 |

FOREIGN PATENT DOCUMENTS

| | | |
|---|---|---|
| EP | 0 710 046 | 5/1996 |
| EP | 0 884 924 | 12/1998 |
| EP | 0 901 301 | 3/1999 |
| JP | 07-066845 | 3/1995 |
| JP | 09-261238 | 10/1997 |
| JP | 10-23020 | 1/1998 |
| JP | 10-303940 | 11/1998 |
| JP | 11-074894 | 3/1999 |
| JP | 2000-013397 | 1/2000 |

OTHER PUBLICATIONS

Japanese Office Action, dated May 11, 2001, with English language translation of Japanese Examiner's comments.
German Office Action, dated Nov. 14, 2000, with English language translation of German Examiner's comments.
German Office Action dated Jul. 2, 2003 with English translation.
Article from the IEEE Journal, Titled: Modeling and Performance Comparison of Policing Mechanisms for ATM Networks vol. 9, No. 3 by Erwin P. Rathgeb.

* cited by examiner

*Primary Examiner*—Huy D. Vu
*Assistant Examiner*—Daniel Ryman
(74) *Attorney, Agent, or Firm*—Whitham, Curtis & Christofferson, P.C.

(57) ABSTRACT

An ATM cell buffer system for buffering ATM cells in various network nodes forming an ATM network, comprising a congestion control unit for controlling congestion of the ATM cells, and further comprising a control counter for counting the number of ATM cells supplied from the ATM cell buffer, in every predetermined period, for every VC queue, within the congestion control unit 30, the congestion control unit deciding the count value of the counter as the minimum output bandwidth for deciding the number of ATM cells to be stored in the next predetermined period, for every connection.

8 Claims, 11 Drawing Sheets

ATM CELL BUFFER SYSTEM AND ITS CONGESTION CONTROL METHOD

BACKGROUNDS OF THE INVENTION

1. Field of the Invention

The present invention relates to an ATM cell buffer system of an ATM (Asynchronous Transfer Mode) network and its congestion control method, and more particularly to an ATM cell buffer system capable of restraining loss rate of ATM cells and its congestion control method.

2. Description of the Related Art

As the conventional congestion control method in an ATM network, there is a method of preventing congestion from progressing, by abandoning a new ATM cell entering during congestion, depending on the amount of buffer use and the loss level assigned in every connection.

Further, there is another congestion control method of preventing the influence on the ATM cell caused by the congestion in another connection, by simply defining the maximum number of stored cells in every connection.

As the other conventional congestion control method, the Japanese Patent Publication Laid-Open (Kokai) No. Heisei 10-023020 discloses a technique for making good use of system resources by abandoning the remaining cells thereafter when even one cell of a plurality of cells forming each packet is abandoned. The Japanese Patent Publication Laid-Open (Kokai) No. Heisei 10-303940 discloses a technique for passing only the cell belonging to one or a plurality of burst data specified at the arrival time of each head cell of each burst data and abandoning cells belonging to the other burst data, when a plurality of burst data toward the same output line flows into a switching system at the same time.

The above-mentioned conventional congestion control method has the following problems.

First, the method which abandons a new ATM cell entering during the congestion, depending on the amount of buffer use and the loss level assigned in very connection, has a problem that an ATM cell may be abandoned also in a connection other than the connection causing congestion because of the congestion in that connection.

Second, the method of preventing the influence on the ATM cell caused by the congestion of another connection by defining the maximum number of stored cells in every connection has a problem that no effective use of the ATM cell buffer is made because it is impossible to store cells of the maximum number of stored cells and more for every connection even if there is enough space for resources of the ATM cell buffer in a non-congested situation.

SUMMARY OF THE INVENTION

In order to solve the above problems, a first object of the present invention is to provide an ATM cell buffer system for realizing the low loss rate of ATM cells by restraining the influence on another connection in a congested state and its congestion control method.

A second object of the present invention is to provide an ATM cell buffer system capable of making good use of ATM cell buffer in a non-congested state and its congestion control method.

According to the first aspect of the invention, an ATM cell buffer system for buffering ATM cells in various network nodes forming an ATM network, comprises congestion control means for controlling congestion of the ATM cells, and control counter means for counting the number of ATM cells supplied from the ATM cell buffer, in every predetermined period, for every VC (Virtual Channel) queue, within the congestion control means, the congestion control means deciding the count value of the control counter means as minimum output bandwidth for deciding the number of ATM cells to be stored in the next predetermined period, for every connection.

In the preferred construction, the control counter means comprises first counting means for counting the number of ATM cells supplied from the ATM cell buffer in the present predetermined period as a first count value, and second counting means for counting the number obtained by subtracting the number of ATM cells stored in the ATM cell buffer in the present predetermined period from the first count value in the previous predetermined period, as a second count value, wherein the control counter means sets the first count value as the minimum output bandwidth, and decides whether the ATM cell is stored in the ATM cell buffer or abandoned, according to the second count value.

In another preferred construction, the congestion control means judges congestion of the ATM cell buffer by three types of non-congested state, low-congested state, and high-congested state for every VC queue, in the case of the non-congested state, the congestion control means stores an ATM cell indifferently to the second count value of the control counter means, in the case of the low-congested state, the congestion control means abandons an ATM cell only when there is a stored cell within a VC queue and an ATM cell is supplied beyond the minimum output bandwidth, and in the case of the high-congested state, the congestion control means always abandons an ATM cell.

In another preferred construction, the congestion control means comprises congestion judging means for judging congestion of the ATM cell buffer by three types of the non-congested state, the low-congested state, and the high-congested state, for every VC queue, and stored cell counter means for counting the number of stored cells for every VC queue and notifying the presence of the stored cell just before storing an input ATM cell, wherein judging whether an ATM cell is stored or abandoned, based on the judgement result from the congestion judging means and the notification from the stored cell counter means, wherein the congestion control means judges whether an ATM cell is stored or abandoned, based on the judgment result from the congestion judging means and the notification from the stored cell counter means.

In another preferred construction, the control counter means has two areas; a first area for storing the first count value and a second area for storing the second count value as a storable count value, and the congestion control means comprises switching control means for switching the first area and the second area in every predetermined period, the area switching by the switching control means enabling the first count value to be passed to the second counting means.

In another preferred construction, the switching control means comprises a register for previously establishing a predetermined hour for switching the two areas, an internal counter for counting the predetermined hour established in the resister, and a logical circuit for creating an area switching signal when the value of the internal counter arrives at the predetermined hour.

In another preferred construction, the ATM cell buffer system further comprises output control means for controlling priority of VC queues of output ATM cells, based on an output request signal from the respective VC queues, according to the sequence of delay priority, while mediating between output rate control by shaping for every VC an output request from the respective VC queues, and selecting a VC queue, the output control means performing shaping for guaranteeing bandwidth on an output request from a VC queue, as for connection between QOS (Quality of Service) classes with the guarantee of the bandwidth, and not performing shaping for guaranteeing bandwidth on an output request from a VC queue, as for a connection between the QOS classes with no guarantee of bandwidth.

According to the second aspect of the invention, a congestion control method in an ATM cell buffer system, provided with congestion control means for controlling congestion of an ATM cell, for buffering the ATM cells in various network nodes forming an ATM network, comprising in the congestion control means, a step of counting the number of ATM cells supplied from an ATM cell buffer, in every predetermined period, for every VC queue, and a step of deciding the count value as minimum output bandwidth for deciding the number of ATM cells to be stored in the next predetermined period, for every connection.

In the preferred construction, the counting step includes a first counting step of counting the number of ATM cells supplied from the ATM cell buffer in the present predetermined period as a first count value, a second counting step of counting the number obtained by subtracting the number of ATM cells stored in the ATM cell buffer in the present predetermined period from the first count value in the previous predetermined period, as a second count value, wherein setting the first count value as the minimum output bandwidth, and deciding whether the ATM cell is stored in the ATM cell buffer or abandoned, according to the second count value.

In another preferred construction, a congestion control method further comprises a step of judging congestion of the ATM cell buffer by three types of non-congested state, low-congested state, and high-congested state, for every VC queue, a step of storing an ATM cell indifferently to the second count value in the case of the non-congested state, a step of abandoning an ATM cell only when there is a stored cell within a VC queue and an ATM cell is supplied beyond the minimum output bandwidth, in the case of the low-congested state, and a step of always abandoning an ATM cell in the case of the high-congested state.

In another preferred construction, a congestion control method further comprises a step of judging congestion of the ATM cell buffer by three types of the non-congested state, the low-congested state, and the high-congested state, for every VC queue, a step of counting the number of stored cells for every VC queue and notifying the presence of the stored cell just before storing an input ATM cell, and a step of judging whether an ATM cell is stored or abandoned, based on the judgment result of the congestion and notification of the presence of the stored cell.

In another preferred construction, a congestion control method further comprises a step of controlling priority of VC queues of output ATM cells, based on an output request signal from the respective VC queues, according to the sequence of delay priority, while mediating between output rate control by shaping for every VC and output request from the respective VC queues, and selecting a VC queue, a step of performing shaping for guaranteeing bandwidth on an output request from a VC queue, as for a connection between QOS classes with the guarantee of the bandwidth, and restricting the receipt of output requests, and a step of performing no shaping for guaranteeing bandwidth on an output request from a VC queue, as for a connection between the QOS classes with no guarantee of the bandwidth.

According to another aspect of the invention, an ATM cell buffer system which buffers ATM cells in various network nodes forming an ATM network, comprises congestion control unit which controls congestion of the ATM cells, and control counter which counts the number of ATM cells supplied from an ATM cell buffer, in every predetermined period, for every VC queue, within the congestion control unit, the congestion control unit deciding the count value of the control counter as minimum output bandwidth for deciding the number of ATM cells to be stored in the next predetermined period, for every connection.

Other objects, features and advantages of the present invention will become clear from the detailed description given herebelow.

BRIEF DESCRIPTION OF THE DRAWINGS

The present invention will be understood more fully from the detailed description given herebelow and from the accompanying drawings of the preferred embodiment of the invention, which, however, should not be taken to be limitative to the invention, but are for explanation and understanding only.

In the drawings.

DESCRIPTION OF THE PREFERRED EMBODIMENT

The preferred embodiment of the present invention will be discussed hereinafter in detail with reference to the accompanying drawings. In the following description, numerous specific details are set forth in order to provide a thorough understanding of the present invention. It will be obvious, however, to those skilled in the art that the present invention may be practiced without these specific details. In other instance, well-known structures are not shown in detail in order to unnecessary obscure the present invention.

Figure 1:
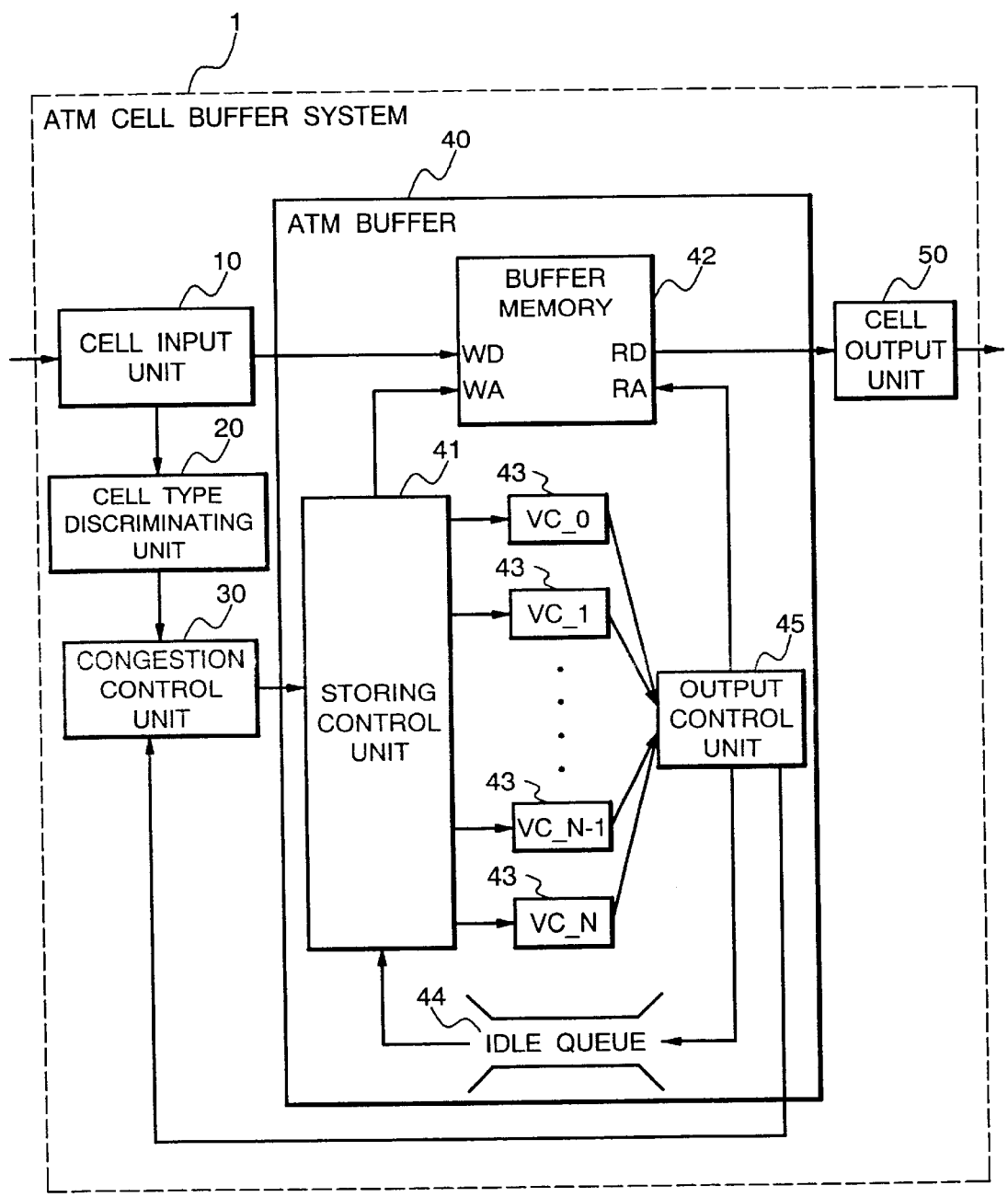
FIG. 1 is a block diagram showing the structure of an ATM cell buffer system, according to the form of an embodiment of the present invention.

Hereinafter, the form of an embodiment of the present invention will be described in detail with reference to the drawings. FIG. 1 is a block diagram showing the structure of an ATM cell buffer system, which the present invention is adopted to, according to the form of the first embodiment.

In FIG. 1, an ATM cell buffer system 1 of this embodiment comprises a cell input unit 10, a cell type discriminating unit 20, a congestion control unit 30, an ATM cell buffer 40, and a cell output unit 50.

The cell input unit 10 receives input of the ATM cell and transfers necessary data to the ATM cell buffer 40 and the cell type discriminating unit 20.

The cell type discriminating unit 20 recognizes setting information from the received ATM cell, such as delay level and loss level, described for every connection necessary for buffer control and sends the setting information to the congestion control unit 30.

The congestion control unit 30 monitors congestion of the ATM cell buffer 40 and judges whether the received ATM cell is stored in the ATM cell buffer 40 or not.

The ATM cell buffer 40 buffers an ATM cell. As this ATM cell buffer 40, a RIRO (RANDOM IN RANDOM OUT) buffer is used, thereby to be able to decide the output sequence independently of the input sequence and output cells from that one of the highest delay priority among the QOS. The cell output unit 50 supplies the ATM cell read out from the ATM cell buffer 40.

The detailed operation of the ATM cell buffer 40 buffering an ATM cell is as follows.

When the ATM cell buffer 40 receives an instruction to store an ATM cell from the congestion control unit 30, a storing control unit 41 fetches the address data indicating which address area in the buffer memory 42 the data should be stored in, from the head of an idle queue 44, so to store the ATM cell supplied from the cell input unit 10, in this address area, as well as to store the storing destination address in a VC queue 43 corresponding to the input ATM cell, the VC queues 43 being classified by every connection.

The detailed operation of each VC queue 43 is as follows. The respective VC queues 43 supply an output requesting signal to the output control unit 45 when there is a stored ATM cell.

Upon receipt of the output request from the respective VC queues 43, the output control unit 45 controls the priority of the VC queues 43 of the output ATM cell, according to the delay priority sequence, and selects a VC queue 43, while mediating between the output rate control by shaping for every VC and the output request from the respective VC queues 43.

The output control unit 45 fetches the memory address in the buffer memory 42 from the head of the selected VC queue 43, reads out the stored ATM cell from the buffer memory 42 at the corresponding address, and supplies it to the cell output unit 50.

Figure 2:
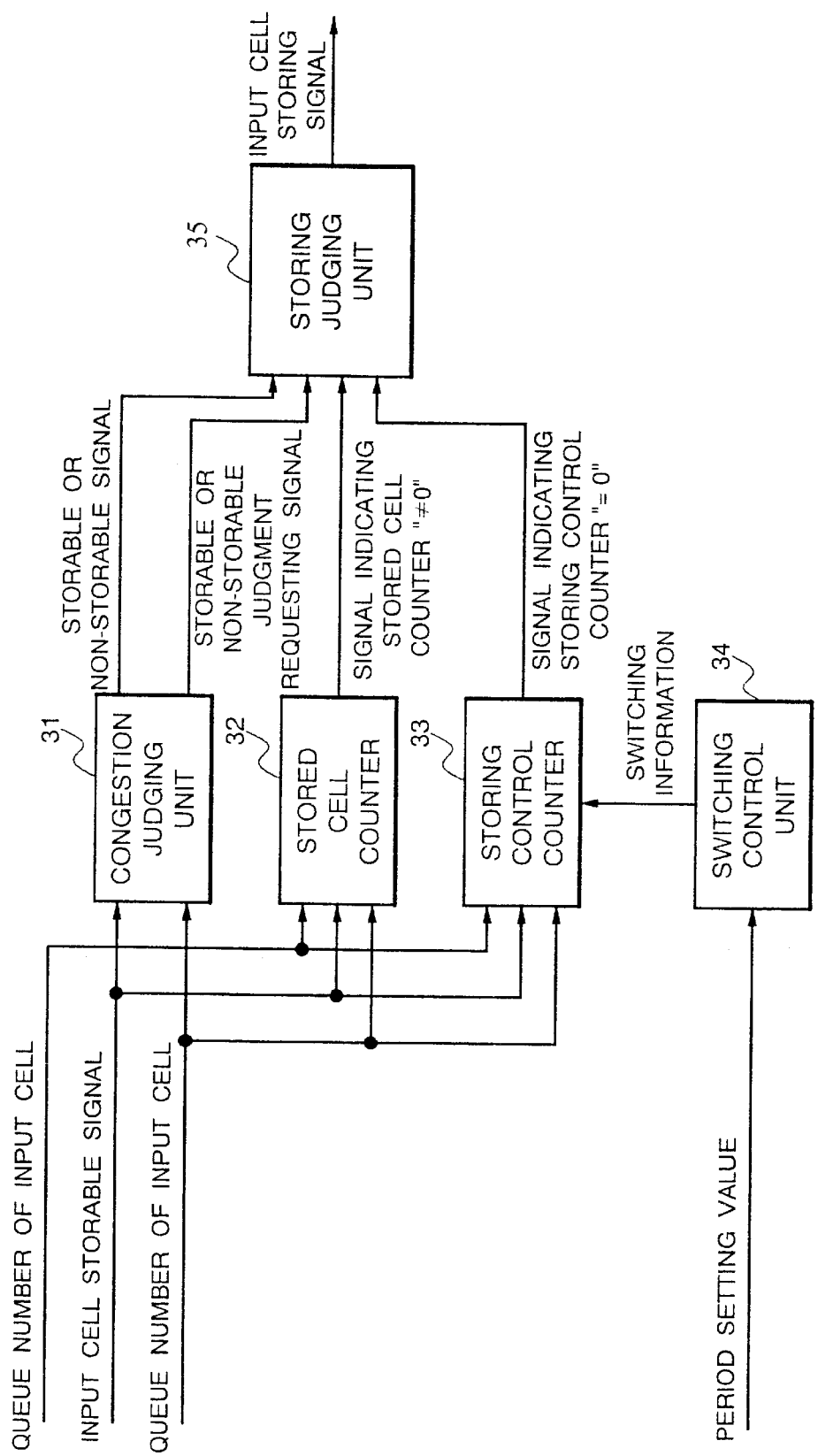
FIG. 2 is a block diagram showing the detailed structure of a congestion control unit, according to the form of an embodiment of the present invention.

FIG. 2 shows the detailed structure of the congestion control unit 30 in the ATM cell buffer system 1, according to the form the first embodiment. In FIG. 2, the congestion control unit 30 comprises a congestion judging unit 31, a stored cell counter 32, a storing control counter 33, and a switching control unit 34, and a storing judging unit 35.

The congestion judging unit 31 detects congestion according to the amount of use of the buffer memory 42. The stored cell counter 32 counts the number of the stored cells for every VC queue 43, and when the number of the stored cells is "0" just before storing an input ATM cell, it notifies the storing judging unit 35 to the same effect.

The storing control counter 33 is provided with a memory storing the count value for counting the number of output ATM cells in every VC queue 43 and the count value obtained by subtracting the number of ATM cells stored in the buffer memory 42 from the number of ATM cells output at the last periodic hour in every VC queue 43, and controls the memory.

The switching control unit 34 switches the area for storing the count value of the number of the output ATM cells and the area for storing the count value of the number of the storable ATM cells, within the memory in the storing control counter 33.

Figure 3:
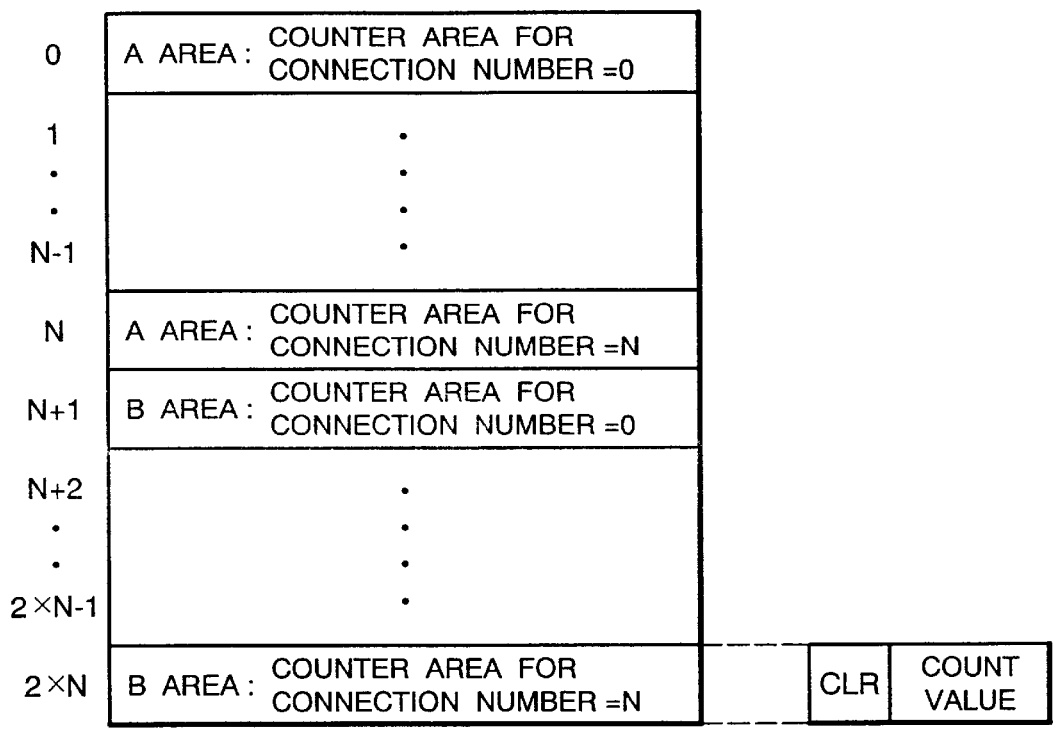
FIG. 3 is a view showing the structure of a storing control counter, according to the form of an embodiment of the present invention.

FIG. 3 shows the structure of the memory within the storing control counter 33, in the ATM cell buffer system 1 and its control method according to the form of the first embodiment of the present invention. In FIG. 3, in the structure of the memory within the storing control counter 33, one memory block is formed by the area for counting the number of the output ATM cells and the area for showing the number of the storable cells obtained by subtracting the number of the output ATM cells from the total number of the periodically output ATM cells.

Storing control is realized by switching the two areas by turns. This switching is performed by the instruction from the switching control unit 34.

Figure 4:
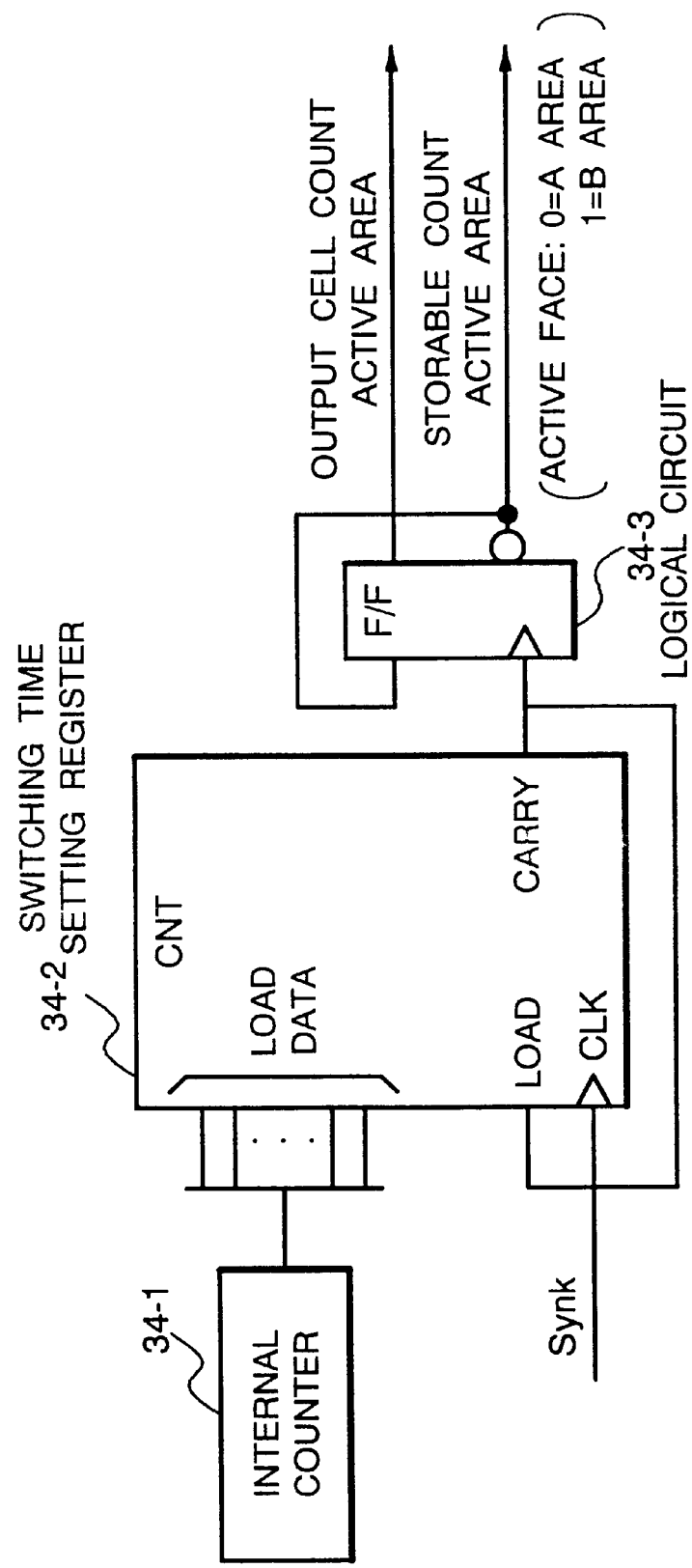
FIG. 4 is a view showing the detailed structure of a switching control unit, according to the form of an embodiment of the present invention.

FIG. 4 shows the detailed structure of the switching control unit 34 of the ATM cell buffer system 1 according to the form of the first embodiment. In FIG. 4, the switching control unit 34 comprises an internal counter 34-1, a switching time setting register 34-2, and a logical circuit 34-3.

The internal counter 34-1 counts a predetermined hour for switching the two information areas of the memory within the storing control counter 33 by the unit of the predetermined hour.

The switching time setting register 34-2 has a function of setting the predetermined hour in an adjustable way depending on the characteristic of the possible traffic in the initial setting at the activation, and when the count value of the output ATM cells indicates the active area at the next period, it rewrites the CLR bit data in the active area of the storing control counter 33 as "1".

The logical circuit 34-3 creates a switching signal having an exclusive logic for the active area.

Figure 5:
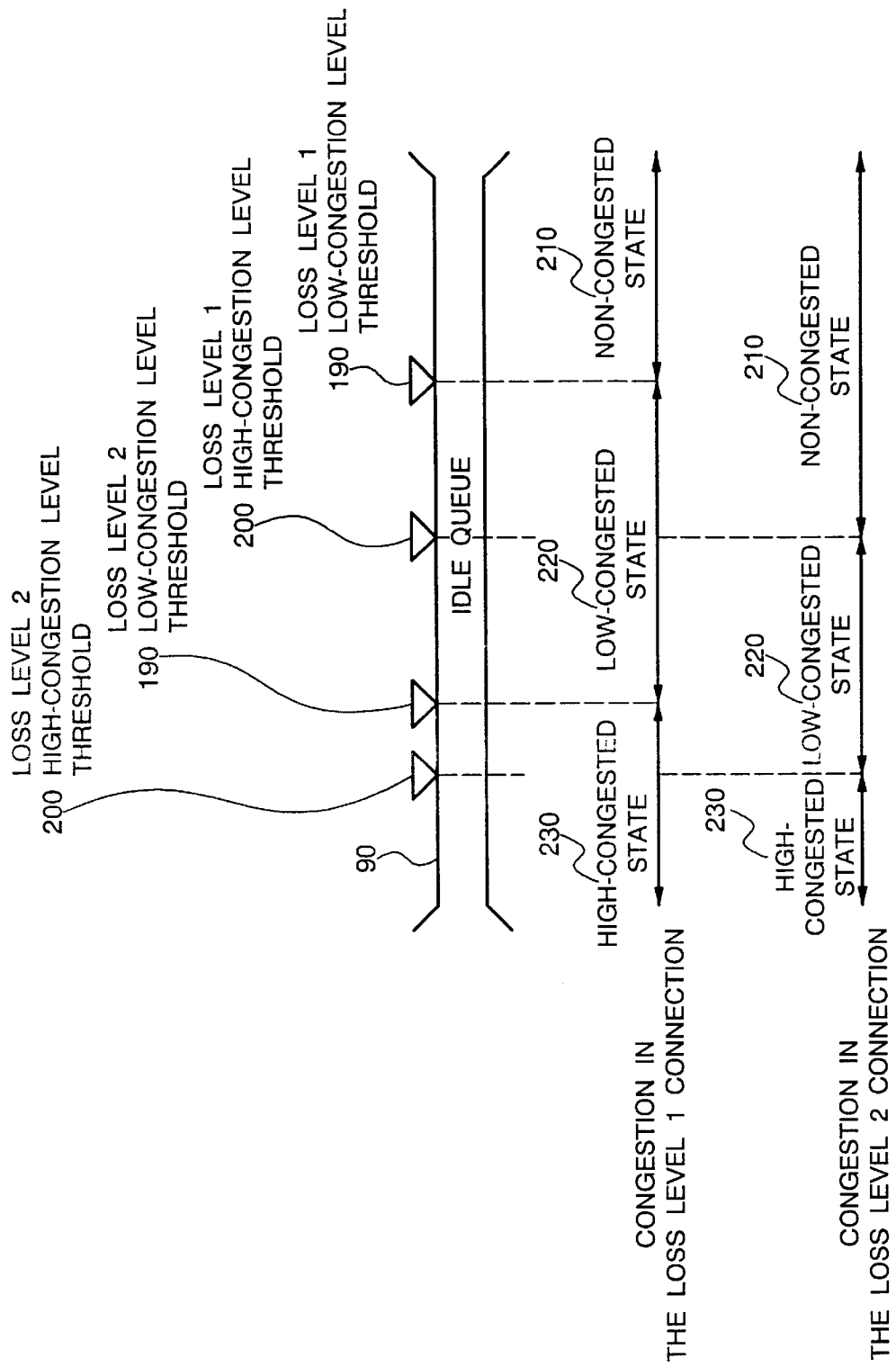
FIG. 5 is a view for use in describing a congested state, according to the form of an embodiment of the present invention.

FIG. 5 shows the judgment of congestion state by the congestion judging unit 31, according to the first embodiment. In FIG. 5, the congestion judging unit 31 has two thresholds; a threshold of low congestion level 190, corresponding to the number of the idle queues 44 in use, and a threshold of high congestion level 200, in every loss level.

The loss level information of the input ATM cell is received from the cell type discriminating unit 20, the threshold of the loss level is compared with the number of the idle queues 44 in use at the time, thereby obtaining information of the congestion level and notifying the same congestion level to the storing judging unit 35.

The storing judging unit 35 finally judges whether the input ATM cell is stored in the buffer 40 or abandoned, based on three data signals: the congestion level data from the congestion judging unit 31, a signal indicating the storing number "≠0" from the stored cell counter 32, and a signal indicating the storing number "=0" from the storing control counter 33.

This time, the operation of the ATM cell buffer system 1 according to the form of the embodiment constituted as mentioned above will be described.

In the initial state, no stored cell is in the ATM cell buffer 40 and no congestion occurs.

Generally, in an ATM network, since the connection setting is performed prior to the data transfer, the connection information of an ATM cell is established in the cell type discriminating unit 20, at the connection setting time, and the setting of the delay priority for every connection and a shaper for a connection having the bandwidth assignment is performed in the output control unit 45.

Figure 6:
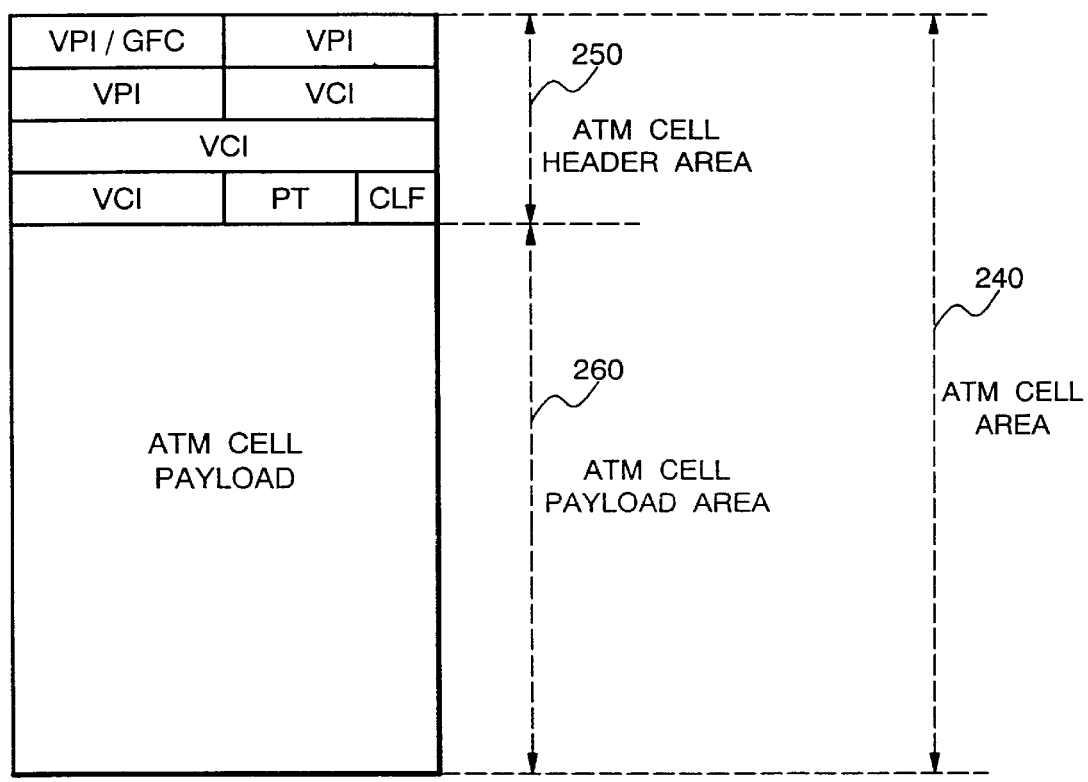
FIG. 6 is a view for use in describing the structure of an ATM cell, according to the form of an embodiment of the present invention.

When an ATM cell arrives at the cell input unit 10, the connection discriminating data area of the same cell (header area 250 of the ATM cell shown in FIG. 6) is transferred to the cell type discriminating unit 20, in the cell input unit 10, and the whole data of the ATM cell area 240, which includes header area of the cell 250 and ATM cell payload area 260, is transferred to the buffer memory 42.

The cell type discriminating unit 20 receives the connection discriminating data area from the cell input unit 10, recognizes the queue number (VC_NO) set by the same connection discriminating data and the loss level of the same connection, and notifies them to the congestion control unit 30.

Figure 7:
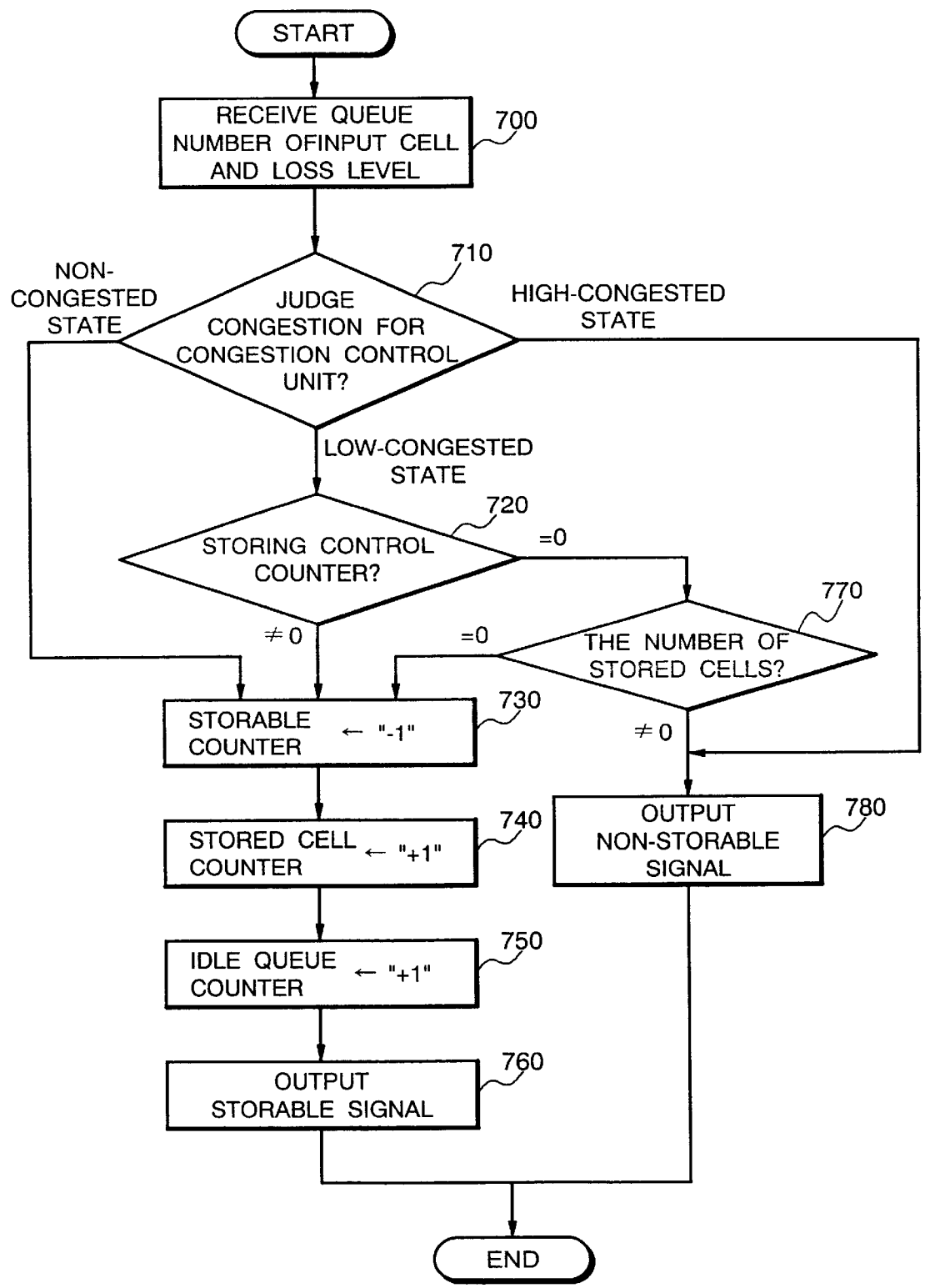
FIG. 7 is a flow chart for use in describing the operation of the congestion control unit at a cell input time, according to the form of an embodiment of the present invention.

FIG. 7 is a flow chart showing the ATM cell storing operation of the congestion control unit 30.

The congestion control unit 30 receives the loss level and the queue number (VC_NO) from the cell type discriminating unit 20 (Step 700), and judges the congestion according to the number of idle queues 44 in use (Step 710).

The congestion consists of non-congested state 210, low-congested state 220, and high-congested state 230, and based on the number of idle queues 44 in use, judgment is made by comparing the threshold of low congestion level 190 with the threshold of high congestion level 200 in every loss level established for every connection (FIG. 5).

As the result of this judgment, when the congestion is in the non-congested state 210, an input ATM cell is stored in the buffer memory 42, indifferently of the other condition (Step 710).

When the congestion is in the low-congested state 220, if the signal indicating the stored cell counter "≠0" is not active and the signal indicating the storing control counter "=0" is not active, an input ATM cell will be stored in the buffer memory 42 (Steps 720 and 770), and if the signal indicating the stored cell counter "≠0" and the signal indicating the storing control counter "=0" are both active, the input ATM cell is judged impossible to be stored in the buffer memory 42 (Step 770) and a non-storable signal is supplied (Step 780).

When the congestion is in the high-congested state 230, an input ATM cell is judged impossible to be stored in the buffer memory 42 indifferently of the other condition (Step 710), and the non-storable signal is supplied (Step 780).

As mentioned above, when an input ATM cell is judged possible to be stored by the storing judging unit 35, the storing control count value for the corresponding connection by the storing control counter 33 is set as "−1" (Step 730), the stored cell counter 32 of the corresponding queue is set as "+1" (Step 740), the using number of the idle queues 44 by the congestion judging unit 31 is set as "+1" (Step 750), and the storable signal of an input cell becomes active (Step 760). When the output ATM cell count value is "0", it remains as "0".

When there is stored data in the VC queue 43, the output request is issued to the output control unit 45.

The output control unit 45 controls receipt of the output requests while shaping the output requests from the VC queues 43 so as to assure bandwidth, as for a connection between the QOS classes with guarantee of the bandwidth, mediates a sending right between the output requests from the VC queues 43, as for a connection between the same QOS classes, without discrimination therebetween, in the ROUND ROBIN method, and performs the priority control on the output requests from the VC queues 43, as for a connection between the different QOS classes, according to the sequence of the delay priority.

It is not necessary to perform shaping for the bandwidth guarantee on the output requests from the VC queues 43, as for the connection between the non-guaranteed QOS classes. A sending right is mediated between the output requests from the VC queues 43 without discrimination, as for the connection between the same QOS classes, in the ROUND ROBIN method, and only the priority control is performed on the output requests from the VC queues 43, as for the connection between the different QOS classes, according to the sequence of the delay priority.

The output control unit 45 reads out the address of the buffer memory 42 from the head of the VC queue 43 where the data is decided to be supplied, reads out the ATM cell data from the corresponding address area, and supplies the ATM cell to the cell output unit 50.

Figure 8:
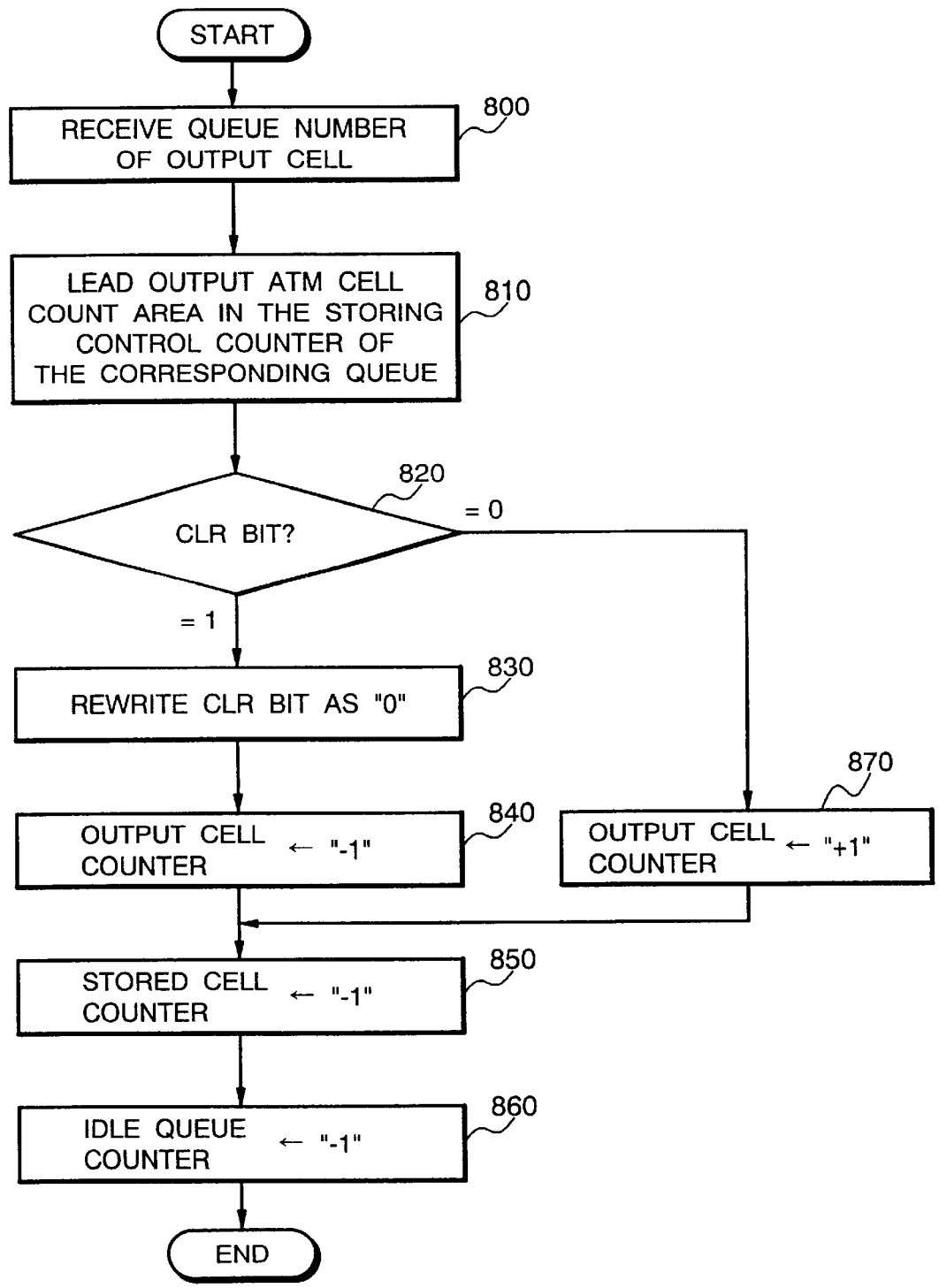
FIG. 8 is a flow chart for use in describing the operation of the congestion control unit at a cell output time, according to the form of an embodiment of the present invention.

The operation of the congestion control unit 30 at the time of ATM cell output will be described with reference to FIG. 8.

The congestion control unit 30 receives the VC queue of the ATM cell read out from the output control unit 45 (Step 800), leads the count area for the number of presented cells in the storing control counter 33 of the corresponding queue (Step 810), distinguishes CLR bit (Step 820) and rewrites the CLR bit as "0" (Step 830 as well as rewrites the output ATM cell number count value for the connection by the storing control counter 33 as "1" (Steps 840–860) when the CLR bit data is "=1", and sets the original output ATM cell number count value as "+1" when the CLR bit data is "=0" (Step 870).

Then, "−1" is added to the stored cell counter 32 of the corresponding queue (Step 850), and "−1" is added to the idle queue using amount of the congestion judging unit 31 (Step 860). When the idle queue using amount and the stored cell counter 32 of the corresponding queue are both "0", they remain as "0".

When the CLR bit is "=1", this means the output ATM cell is the first one in this period, and when the CLR bit is "=0", this means the output ATM cell is that one later than the first one in this period.

The storing control counter 33 consists of two areas; an area for indicating the number of storable cells for every VC and an area for counting the number of output cells, as illustrated in FIG. 3.

The area for indicating the number of storable cells used in the present period replaces the area for counting the number of output cells having been used in the previous period, by switching them. In short, the number of output ATM cells in the previous period is indicated as the number of storable cells in the present period.

In order to prevent from the addition of the count value remaining without being stored in the present period to the number of output cells in the next period when counting it, CLR bit is provided in each area, and each CLR bit of the corresponding areas in all the VC queues is rewritten as "=1" during the period in which the area is used as that one for indicating the number of storable cells (Step 950).

Figure 9:
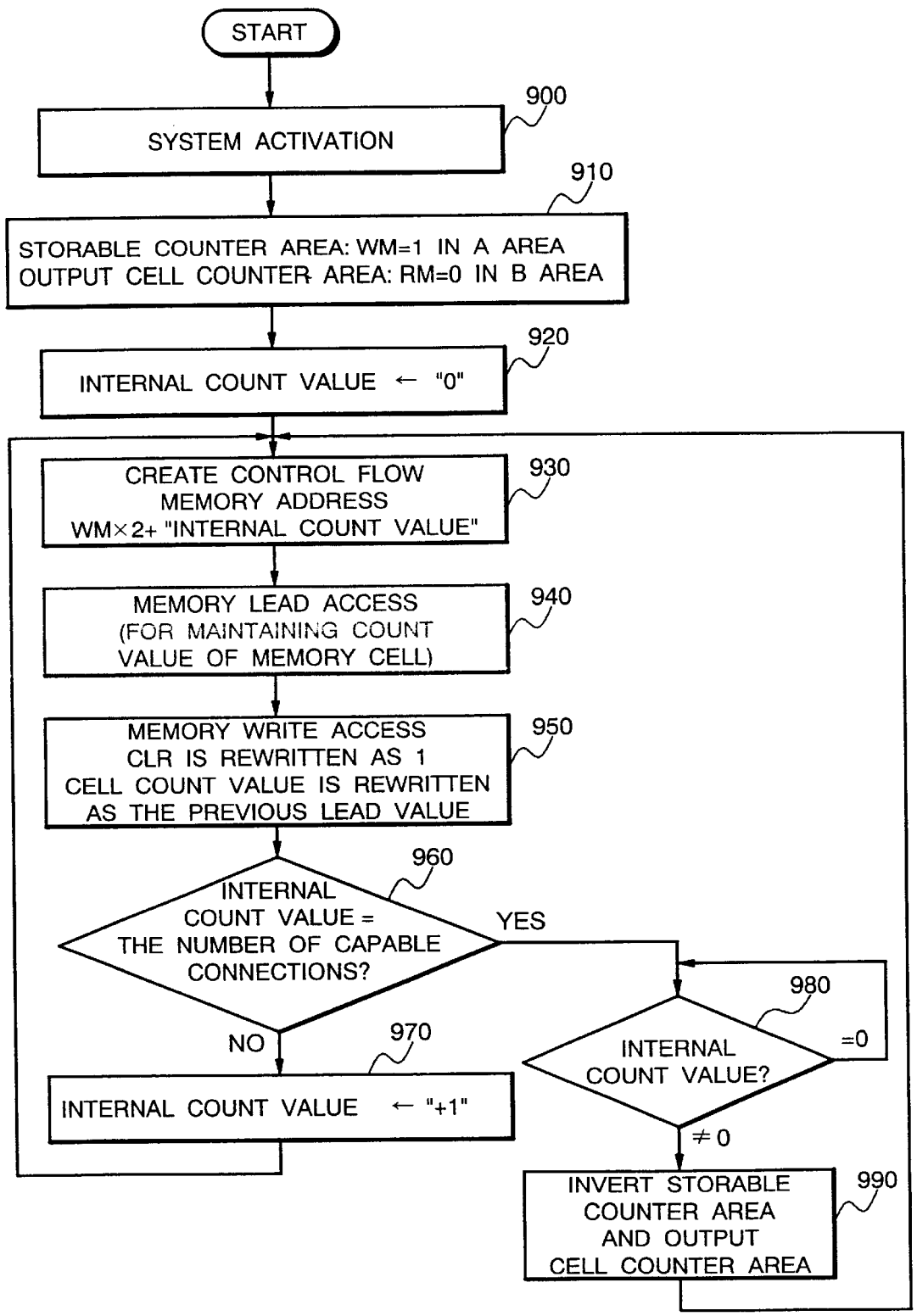
FIG. 9 is a flow chart for use in describing the control of CLR bit of a memory of the storing control counter, according to the form of an embodiment of the present invention.

The content of the CRL bit control of the storable cell counter memory by the switching control unit 34 is shown in FIG. 9. The timing of switching the period is instructed by the switching control unit 34.

The switching time setting register 34-2 starts in the initial setting at the time of system activation (steps 900, 910 and 920), then the internal counter 34-1 starts counting up independently of the presence of ATM cell's input/output (Step 930), a carry signal to be supplied at the over-flow time of the hardware counter reloads the internal counter 34-1 (Step 940), the CLR bit is rewritten as "=1", and the cell count value is rewritten to the above value (Step 950).

This time, it is judged whether the internal count value is equal to the number of capable connections (Step 960); when it is different, the internal count value is set as "+1", and this step is returned to Step 930, where the same steps will be repeated (Step 970). When it is equal, it is queued until the internal counter 34-1 indicates the switching timing of the period (Step 980), a signal for switching the storable cell number indicating area and the output cell number count area notified to the storing control counter 33 is inverted, and this step is returned to Step 930, where the same steps will be repeated (Step 990).

Figure 10:
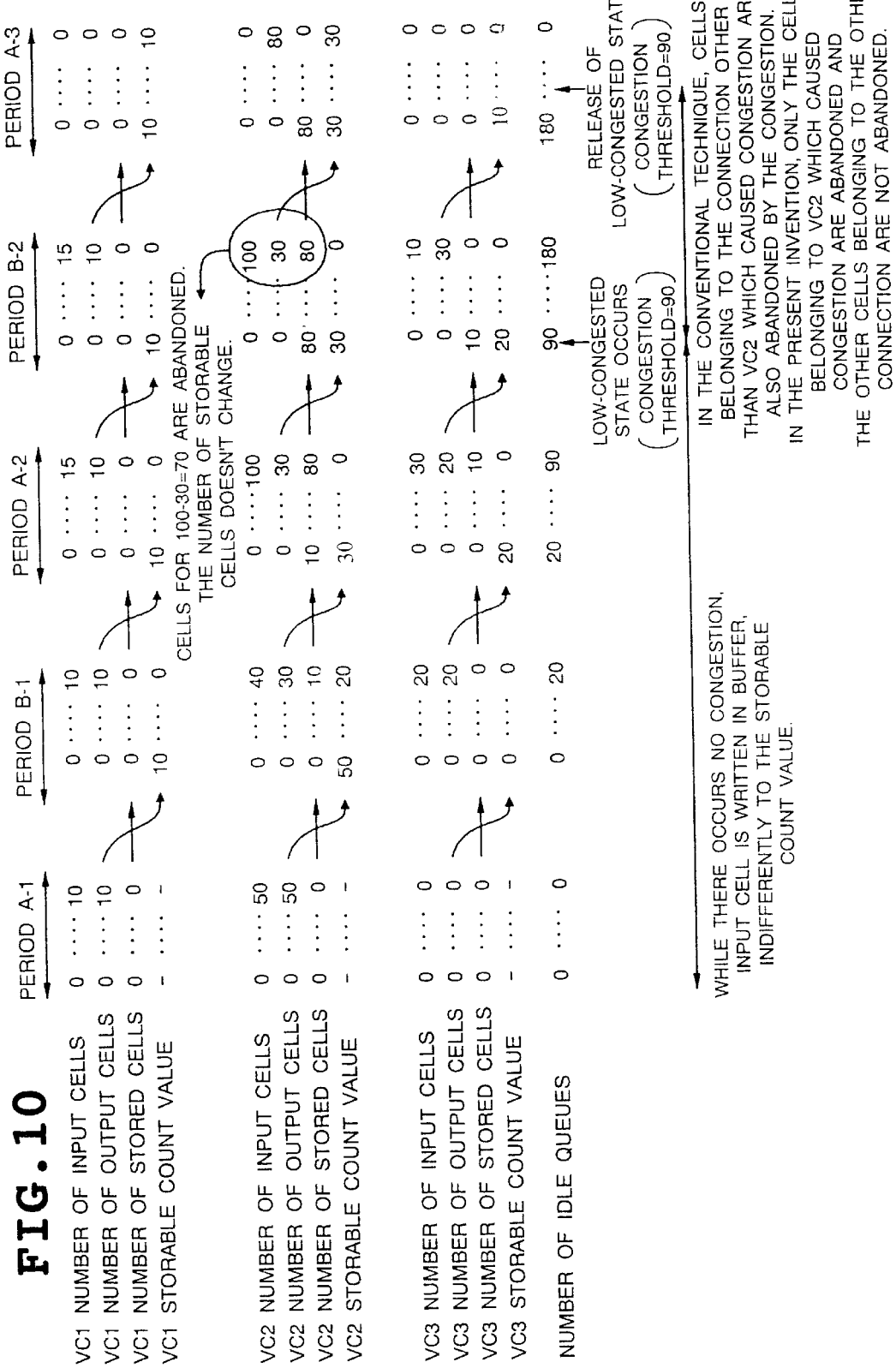
FIG. 10 is a view for use in describing the changing operation of a queue state, indicating the relationship between input-output of an ATM cell according to the form of an embodiment of the present invention.
Figure 11:
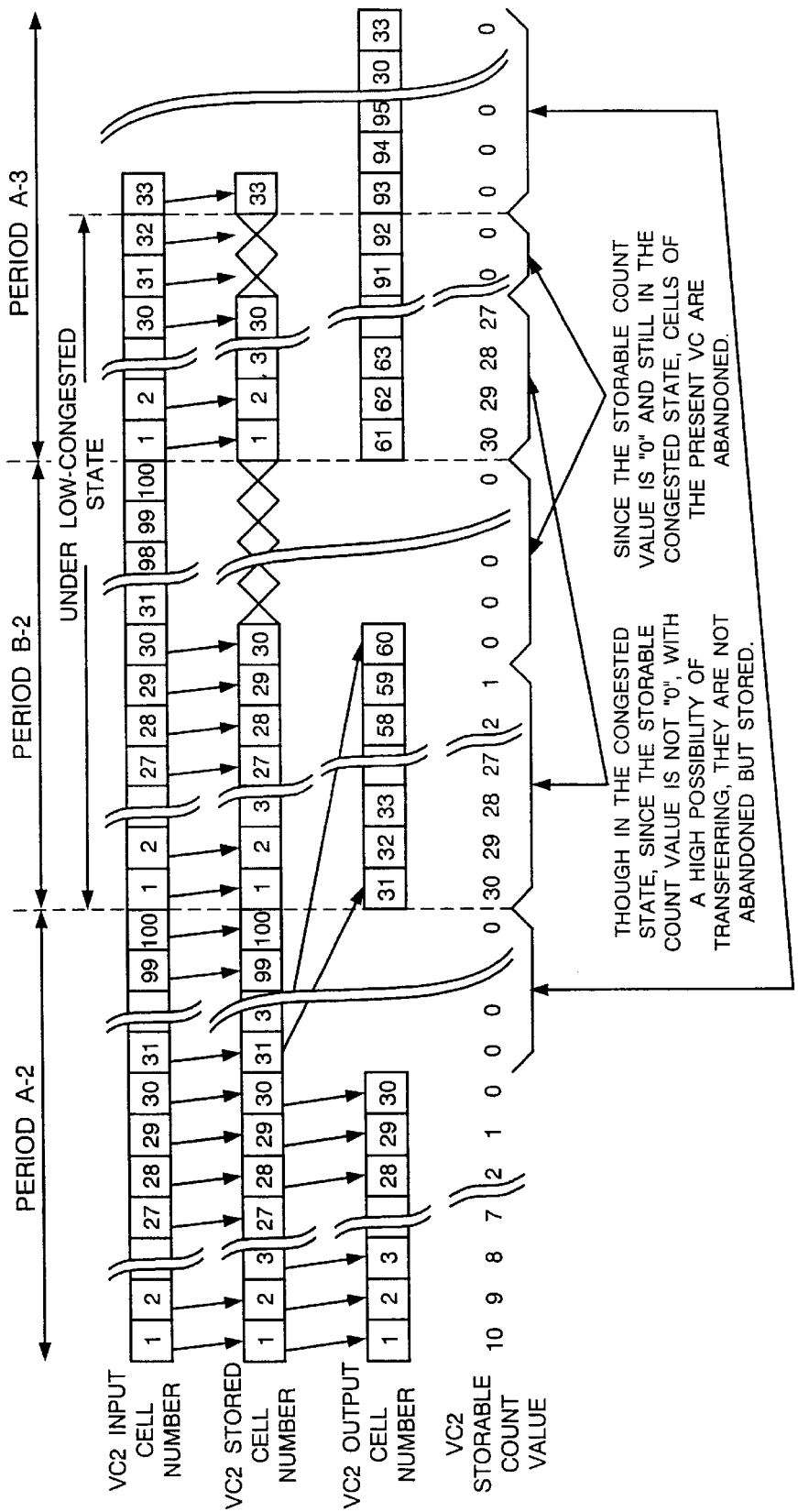
FIG. 11 is a view for use in describing the changing operation of the queue state according to the form of an embodiment of the present invention.

FIGS. 10 and 11 are examples showing the relationship between the ATM cell input-output when using three connections; VC1, VC2, and VC3.

Assume that the system is activated at the head of the period A-1. Assume that the number of input cells, the number of output cells, the number of stored cells, the storable cell count value as for each connection are all "0" at the system activation.

In the example of FIGS. 10 and 11, the connection VC1 belongs to the QOS class with bandwidth assignment, and the connections VC2 and VC3 belong to the same QOS class without bandwidth assignment.

Assume that the QOS corresponding to the VC1 demands low-delay at low-loss rate more than the QOS class corresponding to the VC2/VC3.

Since as for the connection of VC1, ten ATM cells are entered during the period A-1 and ten ATM cells are supplied, the number of stored cells is "0" and the number of the cells that can be supplied is "0" as for the VC1 at the end of the period A-1.

Similarly, since as for the connection of VC2, fifty ATM cells are entered and fifty ATM cells are supplied during the period A-1, the number of stored cells is "0" and the number of the cells that can be supplied is "0" as for the VC2 at the end of the period A-1.

Similarly, since as for the connection of VC3, zero of ATM cell is entered and zero of ATM cell is supplied during the period A-1, the number of stored cells is "0" and the number of the cells that can be supplied is "0" as for the VC3 just before the end of the period A-1.

When moving to the next period B-1, the number of output cells at the period A-1 of each connection becomes the storable count value at the period B-1. However, when no congestion occurs like in the period A-1 and the period B-1, an input cell is stored in the buffer, indifferently to the storable count value.

Similarly, the number of input ATM cells, the number of output ATM cells, the number of stored cells, and the storable count value, for every connection in each period are given.

In the period B-2 in the figures, the storable count value is 10 as for the VC1, the number of stored cells is 80 and the storable count value is 30 as for the VC2, and the number of stored cells is 10 and the storable count value is 20 as for the VC3, just before the start of the present period.

At this time, the number of the idle queues 44 used is obtained as 90 from 80+10, which exceeds the low-congested level threshold 190 for the QOS corresponding to the VC2 and VC3, thereby being in the low-congested state 220. Therefore, the cell of the storable count value and the more is not stored in the buffer memory 42 in the present period B-2 until the congested state is released. Change in the queue state of the VC2 at this time is shown in FIG. 11.

Here, a cell belonging to the VC other than the VC2 which caused congestion has been abandoned in the conventional technique. In the present invention, however, only the cell of the VC2 which caused congestion is abandoned and any cell of the other VC will not be abandoned.

As set forth hereinabove, the ATM cell buffer system and the control method of the present invention is designed not to abandon all the ATM cells even if congestion occurs, but to store the number of the possible output ATM cells into the ATM cell buffer, thereby realizing the low-loss rate of the ATM cell.

Further, it is designed to store a cell indifferently to the storable cell count value when there is no congestion, instead of designing to guarantee the cells only for the lowest bandwidth fixedly, and if an ATM cell is storable, it can be stored in the ATM buffer, thereby realizing the low-loss rate of the ATM cell.

When congestion occurs, since the invention is designed to abandon only the ATM cell that may increase the congestion further, all the ATM cells are not abandoned, but only the ATM cell supposed to increase the congestion further is abandoned, also in the connection with the guarantee of the same loss level. Therefore, it is possible to realize a low-loss rate compared with the connection causing the congestion, or generate no loss, as for the connection which does not cause the congestion.

In the case of being in the high-congested state, it is possible to remove the influence on the other connection with the guarantee of higher-loss level than the guarantee of this loss level, by abandoning the input ATM cell of the connection corresponding to this loss level.

Since it is designed to have each congestion judging level separately, even if congestion occurs in the connection with no guarantee of low-loss rate, between the QOS of different loss level, influence on the loss rate of the other connection with the guarantee of low-loss level can be prevented.

Only in the case where there is a stored cell within a VC queue, in the low-congested state, and an ATM cell is supplied beyond the above output lowest bandwidth, it is designed to abandon the ATM cell, thereby preventing from the situation of completely stacking the data transfer on the corresponding connection. Therefore, it is possible to detect congestion at the upper layer.

Although the invention has been illustrated and described with respect to exemplary embodiment thereof, it should be understood by those skilled in the art that the foregoing and various other changes, omissions and additions may be made therein and thereto, without departing from the spirit and scope of the present invention. Therefore, the present invention should not be understood as limited to the specific embodiment set out above but to include all possible embodiments which can be embodies within a scope encompassed and equivalents thereof with respect to the feature set out in the appended claims.

What is claimed is:

1. An ATM (Asynchronous Transfer Mode) cell buffer system for buffering ATM cells in various network nodes forming an ATM network, comprising:

congestion control means for controlling congestion of the ATM cells; and control counter means for counting the number of ATM cells supplied from an ATM cell buffer, in every predetermined period, for every VC (Virtual Channel) queue, within said congestion control means, wherein said control counter means comprises:

first counting means for counting the number of ATM cells supplied from the ATM cell buffer in the present predetermined period as a first count value, and second counting means for counting the number obtained by subtracting the number of ATM cells stored in the ATM cell buffer in the present predetermined period from the first count value in the previous predetermined period, as a second count value, wherein said control counter means sets the first count value as the minimum output bandwidth, and decides whether the ATM cell is stored in the ATM cell buffer or abandoned, according to the second count value, and said congestion control means judges congestion of the ATM cell buffer by three types of states: non-congested state, low-congested state, and high-congested state for every VC queue and deciding the count value of said control counter means as minimum output bandwidth for deciding the number of ATM cells to be stored in the next predetermined period, for every connection, wherein in the case of the non-congested state, said congestion control means stores an ATM cell indifferently to the second count value of said control counter means, in the case of the low-congested state, said congestion control means abandons an ATM cell only when there is a stored cell within a VC queue and an ATM cell is supplied beyond the minimum output bandwidth, and in the case of the high-congested state, the congestion control means always abandons an ATM cell.

2. An ATM cell buffer system as set forth in claim 1, in which said congestion control means comprises:

congestion judging means for judging congestion of the ATM cell buffer by the three types of states, and stored cell counter means for counting the number of stored cells for every VC queue and notifying the presence of the stored cell just before storing an input ATM cell, wherein judging whether an ATM is stored or abandoned, based on the judgment result from said congestion judging means and the notification from said stored cell counter means.

3. An ATM cell buffer system as set forth in claim 1, in which said control counter means has two areas:

a first area for storing the first count value and a second area for storing the second count value as a storable count value, and said congestion control means comprises switching control means for switching the first area and the second area in every predetermined period, the area switching by said switching control means enabling the first count value to be passed to said second counting means.

4. An ATM cell buffer system as set forth in claim 3, in which said switching control means comprising:

a register for previously establishing a predetermined hour for switching the two areas, an internal counter for counting the predetermined hour established in said register, and a logical circuit for creating an area switching signal when value of said internal counter arrives at the predetermined hour.

5. An ATM cell buffer system as set forth in claim 1, further comprising:

output control means for controlling priority of VC of output ATM cells, based on an output request signal from the respective VC queues, according to the sequence of delay priority, while mediating between output rate control by shaping for every VC and output request from the respective VC queues, and selecting a VC queue, said output control means performing shaping for guaranteeing bandwidth on an output request from a VC queue, as for a connection between QOS (Quality of Service) classes with the guarantee of the bandwidth, and restricting the receipt of output requests, and not performing shaping for guaranteeing bandwidth on an output request from a VC queue, as for a connection between the QOS classes with no guarantee of the bandwidth.

6. A congestion control method in an ATM (Asynchronous Transfer Mode) cell buffer system, provided with congestion control means for controlling congestion of an ATM cell, for buffering the ATM cells in various network nodes forming an ATM network, comprising the steps of:

in said congestion control means, counting the number of ATM cells supplied from an ATM cell buffer, in every predetermined period, for every VC (Virtual Channel) queue, wherein said counting step includes:

first, counting the number of ATM cells supplied from the ATM cell buffer in the present predetermined period as a first count value, second, counting the number obtained by subtracting the number of ATM cells stored in the ATM cell buffer in the present predetermined period from the first count value in the previous predetermined period as a second count value, setting the first count value as minimum output bandwidth for deciding the number of ATM cells to be stored in the next predetermined period, for every connection, deciding whether the ATM cell is stored in the ATM cell buffer or abandoned according to the second count value, judging congestion of the ATM cell buffer by three types of states: non-congested state, low-congested state, and high-congested state, for every VC queue, storing an ATM cell indifferently to the second count value in the case of the non-congested state, abandoning an ATM cell only when there is a stored cell with a VC queue and an ATM cell is supplied beyond the minimum output bandwidth, in the case of the low-congested state, and always abandoning an ATM cell in the case of the high-congested state.

7. A congestion control method in an ATM cell buffer system as set forth in claim 6, further comprising the steps of:

counting the number of stored cells for every VC queue and notifying the presence of the stored cell just before storing an input ATM cell; and judging whether an ATM is stored or abandoned, based on the judgment result of the congestion and the notification of the presence of the stored cell.

8. A congestion control method in an ATM cell buffer system as set forth in claim 6, further comprising the steps of:

controlling priority of VC queues of output ATM cells, based on an output request signal from the respective VC queues, according to the sequence of delay priority, while mediating between output rate control by shaping for every VC and output request from the respective VC queues, and selecting a VC queue;

performing shaping for guaranteeing bandwidth on an output request from a VC queue, as for a connection between QOS (Quality of Service) classes with the guarantee of the bandwidth, and restricting the receipt of output requests; and performing no shaping for guaranteeing bandwidth on an output request from a VC queue, as for a connection between the QOS classes with no guarantee of the bandwidth.

* * * * *